(12) United States Patent
Cantley et al.

(10) Patent No.: US 7,717,329 B1
(45) Date of Patent: May 18, 2010

(54) CHECK CARRIER

(75) Inventors: Kerry M. Cantley, Fort Mill, SC (US); Teresa J. Vasquez, West Covina, CA (US)

(73) Assignee: Bank of America Corporation, Charlotte, NC (US)

( * ) Notice: Subject to any disclaimer, the term of this patent is extended or adjusted under 35 U.S.C. 154(b) by 0 days.

(21) Appl. No.: 11/739,303

(22) Filed: Apr. 24, 2007

Related U.S. Application Data

(63) Continuation of application No. 11/307,668, filed on Feb. 16, 2006, now Pat. No. 7,225,975.

(51) Int. Cl.
*G06Q 40/00* (2006.01)
*G07D 11/00* (2006.01)
*G07F 19/00* (2006.01)
*G06K 7/00* (2006.01)
*G06K 19/00* (2006.01)
*B65D 27/04* (2006.01)
*B42D 15/00* (2006.01)

(52) U.S. Cl. .................. 235/379; 283/57; 283/58; 229/71; 235/487; 235/486

(58) Field of Classification Search .......... 235/379, 235/487, 488, 486; 283/57, 116, 58; 229/71, 229/68.1, 67.4, 313, 92.3, 57; 224/227
See application file for complete search history.

(56) References Cited

U.S. PATENT DOCUMENTS

| | | | | |
|---|---|---|---|---|
| 3,043,506 A | * | 7/1962 | Bremer ..................... 235/495 |
| 3,111,257 A | * | 11/1963 | Peach ....................... 229/302 |
| 3,112,151 A | * | 11/1963 | Buros ....................... 382/320 |
| 3,363,917 A | * | 1/1968 | Gunderson et al. .......... 283/58 |
| 3,431,404 A | * | 3/1969 | Brink ........................ 235/487 |
| 3,576,972 A | * | 5/1971 | Wood et al. ................. 235/487 |
| 3,586,834 A | * | 6/1971 | Dykaar et al. .............. 235/487 |
| 3,588,456 A | * | 6/1971 | McNabb .................... 235/487 |
| 3,593,913 A | * | 7/1971 | Bremer ..................... 229/68.1 |
| 3,642,191 A | * | 2/1972 | Roof .......................... 229/77 |
| 3,666,926 A | * | 5/1972 | Conte et al. ................ 235/487 |
| 3,692,233 A | * | 9/1972 | Carter, Jr. .................... 229/71 |
| 3,693,869 A | * | 9/1972 | Eaves, Jr. ................... 229/302 |
| 3,702,924 A | * | 11/1972 | Wood et al. ................. 235/487 |
| 3,770,943 A | * | 11/1973 | Sill ............................ 235/487 |
| 3,800,124 A | * | 3/1974 | Walsh ........................ 235/488 |
| 4,047,661 A | * | 9/1977 | Klein ......................... 229/70 |
| 4,060,711 A | * | 11/1977 | Buros ........................ 235/488 |
| 4,105,319 A | * | 8/1978 | Wells et al. ................. 353/120 |
| 4,128,202 A | * | 12/1978 | Buros ........................ 235/493 |
| 4,136,471 A | * | 1/1979 | Austin ....................... 224/163 |
| 4,205,780 A | * | 6/1980 | Burns et al. ................. 235/454 |
| 4,278,880 A | * | 7/1981 | Buros ........................ 235/493 |

(Continued)

*Primary Examiner*—Daniel Walsh
(74) *Attorney, Agent, or Firm*—Michael A. Springs; Moore & Van Allen PLLC

(57) ABSTRACT

The check carrier consists of an envelope of translucent material that is dimensioned to closely conform to the dimensions of a standard check. The back of the check carrier includes an endorsement window through which a bank or other financial institution can apply its endorsement stamp directly to the check. The bottom of the check carrier may be provided with an area for receiving the MICR printing such that the MICR can be read directly off of the carrier. The MICR area can be removed. The open end of the check carrier can be sealed closed using a repositionable adhesive. The adhesive can also be used interior of the check carrier such that the adhesive contacts the check to fix the check within the carrier.

19 Claims, 3 Drawing Sheets

U.S. PATENT DOCUMENTS

| | | | | |
|---|---|---|---|---|
| 4,615,480 A * | 10/1986 | Powell | | 229/71 |
| 4,644,144 A * | 2/1987 | Chandek et al. | | 235/487 |
| 4,776,510 A * | 10/1988 | Jenkins | | 229/303 |
| 4,927,071 A * | 5/1990 | Wood | | 229/71 |
| 4,934,587 A * | 6/1990 | McNabb | | 229/71 |
| 5,044,668 A * | 9/1991 | Wright | | 283/58 |
| 5,049,118 A * | 9/1991 | McNabb | | 493/216 |
| 5,052,613 A * | 10/1991 | Lin | | 229/303 |
| 5,126,547 A * | 6/1992 | Norman, Jr. | | 235/487 |
| 5,180,901 A * | 1/1993 | Hiramatsu | | 235/380 |
| 5,251,810 A * | 10/1993 | Kim | | 229/303 |
| 5,271,553 A * | 12/1993 | Kim | | 229/303 |
| 5,276,311 A * | 1/1994 | Hennige | | 235/380 |
| 5,316,208 A * | 5/1994 | Petkovsek | | 229/71 |
| 5,411,201 A * | 5/1995 | Petkovsek | | 229/71 |
| 5,419,588 A * | 5/1995 | Wood | | 283/58 |
| 5,623,552 A * | 4/1997 | Lane | | 382/124 |
| 5,713,511 A * | 2/1998 | Diamond | | 229/302 |
| 5,738,274 A * | 4/1998 | Stude | | 229/301 |
| 5,894,986 A * | 4/1999 | Lederman et al. | | 229/71 |
| 5,954,431 A * | 9/1999 | Fabel | | 383/5 |
| 6,155,481 A * | 12/2000 | Rawlings | | 229/300 |
| 6,325,285 B1 * | 12/2001 | Baratelli | | 235/380 |
| 6,347,812 B1 * | 2/2002 | Herman | | 283/58 |
| 6,367,689 B1 * | 4/2002 | Flynn et al. | | 229/68.1 |
| 6,435,404 B1 * | 8/2002 | Feick | | 229/303 |
| 6,478,229 B1 * | 11/2002 | Epstein | | 235/492 |
| 6,898,299 B1 * | 5/2005 | Brooks | | 382/115 |
| 6,925,565 B2 * | 8/2005 | Black | | 713/186 |
| 6,983,882 B2 * | 1/2006 | Cassone | | 235/382 |
| 7,225,975 B1 * | 6/2007 | Cantley et al. | | 235/379 |
| 7,363,504 B2 * | 4/2008 | Bonalle et al. | | 713/186 |
| 7,461,773 B2 * | 12/2008 | Updike et al. | | 235/379 |
| 2001/0047331 A1 * | 11/2001 | Malanga et al. | | 705/40 |
| 2002/0020735 A1 * | 2/2002 | Hollingbery et al. | | 229/92.8 |
| 2002/0030093 A1 * | 3/2002 | Kim | | 229/302 |
| 2002/0149196 A1 * | 10/2002 | Fabel | | 283/72 |
| 2003/0121962 A1 * | 7/2003 | Hamblin | | 229/305 |
| 2004/0050919 A1 * | 3/2004 | Calonje et al. | | 229/306 |
| 2004/0256444 A1 * | 12/2004 | Becker | | 229/71 |
| 2005/0145682 A1 * | 7/2005 | Auchter et al. | | 229/92.1 |
| 2005/0179255 A1 * | 8/2005 | Olson | | 283/105 |
| 2005/0184140 A1 * | 8/2005 | DeLa Vergne | | 229/301 |
| 2005/0252955 A1 * | 11/2005 | Sugai et al. | | 229/92.3 |
| 2006/0102704 A1 * | 5/2006 | Reynders et al. | | 229/68.1 |
| 2007/0114785 A1 * | 5/2007 | Porter | | 283/58 |
| 2008/0063253 A1 * | 3/2008 | Wood | | 382/137 |
| 2008/0120509 A1 * | 5/2008 | Simon | | 713/186 |

* cited by examiner

CHECK CARRIER

CROSS-REFERENCES

This application is a continuation application of U.S. patent application Ser. No. 11/307,668, filed Feb. 16, 2006, the contents of which is incorporated herein by reference.

BACKGROUND

The invention relates generally to check handling systems and more particularly to an improved check carrier for use in such systems.

It will be appreciated that millions of checks, both commercial and retail, are presented to financial institutions for posting and debiting every day. Each of these checks must be processed by the receiving financial institution and presented to a clearing bank with some checks processed by multiple institutions. Because of the volume of checks handled every day, the processing of checks is typically automated where high speed sorters automatically, read, sort and process the checks based on the MICR (magnetic ink character recognition) code printed on the bottom of the checks. A typical sorter will process 2,500 checks per minute.

Moreover, the Check Truncation Act (Check 21), intended to minimize the disruption of the nation's check collection and forwarding process by eliminating the national check clearing system that relies on paper-processing and physical transport, allows financial institutions to generate substitute image checks, or image replacement documents (IRD's), that have the same legal status as an original check. The IRD's can be sent as images between financial institutions and are treated the same as the original paper document. Again because of the high volume of checks processed each day, checks are scanned in high speed automated scanning equipment to create the IRD's.

Different institutions and different processes may utilize paper documents, IRD's or both. Even when paper documents are physically transferred they must be convertible into IRD's because the receiving institution may want to store the document as an IRD or transfer the document as an IRD to another institution for further processing. Because financial institutions require that checks be scanned into IRD's and/or processed as paper documents, virtually all checks are at some point scanned, processed and/or sorted by a high speed automated process.

When a check is damaged from tearing, folding or the like, the structural integrity of the check may be such that it cannot be put through the automated sorting and scanning equipment. To facilitate the automated processing of damaged checks, check carriers have been developed that hold the check for processing. Known check carriers do not securely retain the check. As a result checks can become separated from the carriers resulting in loss of the check or delay in processing. Additionally, current check carriers do not meet the image quality requirements set forth by the Federal Reserve. As a result financial institutions have been required to forward items in check carriers on a separate cash letter causing additional processing delays. Moreover, known check carriers do not reliably retain the check in a manner where the check can be automatically scanned, sorted and processed while in the carrier. Since existing check carriers do not provide an acceptable image of the front and back of the item, particularly an image of the financial institution's endorsement on the back of the item, financial institutions run the risk of financial loss and additional fees because of the inability to present a clear substitute IRD for clearing.

Thus an improved check carrier that securely retains the check in a manner where it can be easily and accurately scanned, to provide an acceptable image quality and be processed and sorted by automated equipment, is desired.

SUMMARY OF THE INVENTION

An example embodiment of the check carrier of the invention consists of an envelope of transparent material that is dimensioned to closely conform to the dimensions of a standard check. Because checks typically come in a standard commercial size and a different standard retail size, it is contemplated that multiple sized carriers may be used, each dimensioned to be used with a particular size check. The back of the check carrier may include an endorsement window through which a bank or other financial institution can apply its endorsement stamp directly to the check. In one embodiment, the endorsement window is covered by a removable cover that is removed if an endorsement stamp needs to be applied to the check. The bottom of the check carrier may be provided with an area for receiving the MICR printing such that the MICR can be read directly off of the carrier. In one embodiment, the area for receiving the MICR is removable from the body of the check carrier. The open end of the check carrier is sealed by a reusable closure mechanism such as a repositionable adhesive. The adhesive can also be used interior of the check carrier such that the adhesive contacts the check to fix the check within the carrier.

DETAILED DESCRIPTION

Figure 1:
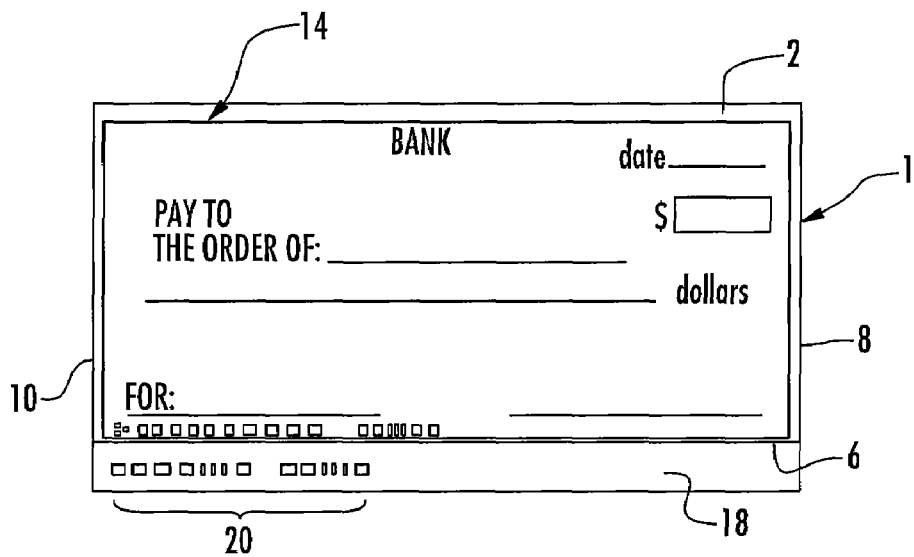
FIG. 1 is a front view of an embodiment of the check carrier of the invention with a check inserted.
Figure 2:
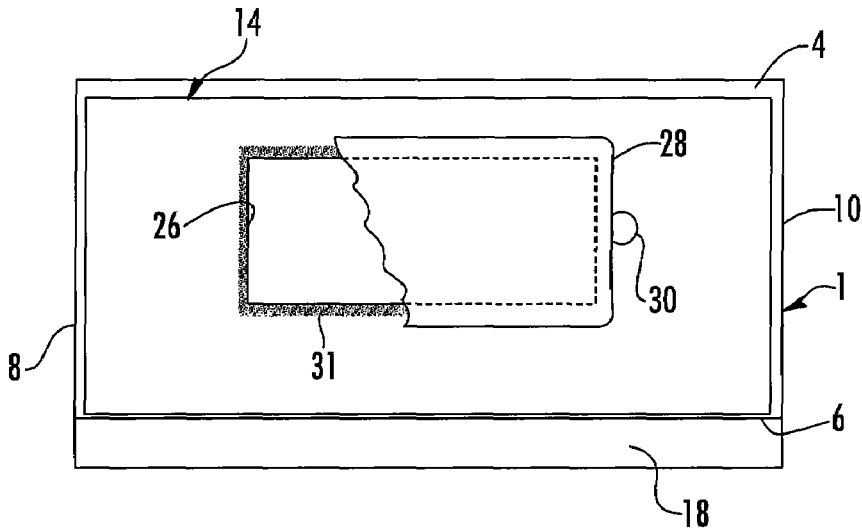
FIG. 2 is a back view of the check carrier of FIG. 1.
Figure 3:
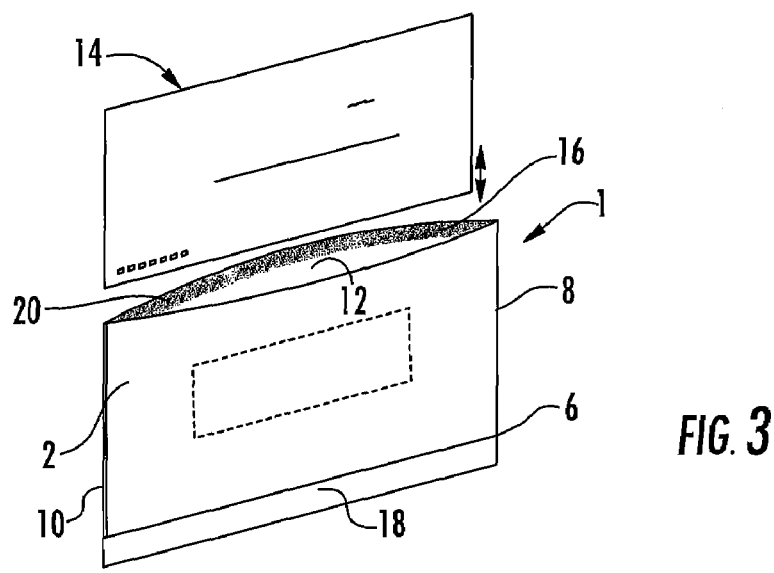
FIG. 3 is a perspective view of the check carrier of FIG. 1 with the check removed.

Referring to FIGS. 1, 2 and 3, the check carrier of the invention is shown generally at 1 and consists of a translucent envelope consisting of a translucent front panel 2 and a translucent back panel 4 joined together along bottom edge 6 and side edges 8 and 10 to define an interior space 12 for receiving the check 14. While in the illustrated embodiment the front and back panels are translucent, it will be appreciated that the panels could have opaque portions and or be transparent. An opening 16 is created between the top edges of the front panel 2 and back panel 4 so that the check 14 can be inserted into the interior space 12. It is to be understood that while opening 16 is located at the top of the check carrier, opening 16 could be located along one of side edges 8 or 10 or along bottom edge 6.

At the bottom edge 6 the front panel 2 and back panel 4 are joined by adhesive, sonic welding or the like to create a flat MICR area 18 that can receive the MICR printing 20. MICR area 18 could also be created during the extrusion process for the front and back panels. MICR stands for Magnetic Ink Character Recognition, and is used to describe the special numbers and symbols found at the bottom of checks, and the technology and processes to produce and analyze these characters. In order to sort checks the MICR must be accessible to the character recognition equipment. Therefore, if a check is to be sorted while in the check carrier, the MICR printing from that check is duplicated on the MICR area 18 of check carrier 1. This allows the check carrier to be read as if it was the actual paper check.

The interior 12 of check carrier 1 is dimensioned to closely receive a standard size check, such that movement of the check 14 within the carrier is limited. Because checks come in at least two standard sizes, retail and commercial, it is contemplated that the check carrier 1 will be come in various sizes where the interior size and shape of the carrier corresponds to the size and shape of the check to be carried. In one embodiment the length and width of the interior 12 are approximately 8.75 inches by 3.75 inches for standard-size business checks and 6.25 inches by 3.0 inches for personal checks.

The front panel 2 may be made of a non-shiny, translucent paper-plastic blend of sturdy construction. The back panel may be made of non-shiny, translucent paper blend similar to tissue paper. Both the front panel and back panel may be porous so as to be able to absorb ink such as for the MICR printing. The use of translucent material for both the front and back of the check carrier allows the automated scanning, sorting and processing equipment to optically access the front and back of the check. The terms "optically access" and "optically accessible" are used to encompass any process where the check is scanned or processed based on a process that relies on light or vision. Other material may be used provided that the material is translucent or transparent and the check carrier is rigid enough to support a check but thin and flexible enough that it can be processed by the sorting and scanning equipment typically used by financial institutions.

A closure mechanism is used for releasably sealing opening 16. In one embodiment the closure mechanism comprises repositionable adhesive 20 such as tacky elastomeric microspheres located along the length thereof for sealing the carrier closed after the check is placed therein. Repositionable adhesives are designed to be reusable such that the mating surfaces can be repeatedly adhered together and separated. It will be appreciated that the adhesive could also be placed on the front panel. Other closure mechanisms such as a zip lock could also be used provided that opening 16 can be repeatedly closed and reopened. In one embodiment, the repositionable adhesive 20 is placed on the inside surface of either one or both of the front and rear panels such that the adhesive is in contact with check 14 when the check is placed in the carrier. The repositionable adhesive 20 serves to maintain the check in position relative to the carrier but allows the check 14 to be removed from the carrier if desired and thus causes the check and carrier to blend into one document.

The back panel 4 includes a window 26 formed therein that allows access to the back of the check. Window 26 allows a financial institution to place its endorsement stamp directly on check 14 without removing the check from the carrier. A peel off cover 28 having thumb tab 30 is provided to cover window 26 when not in use. In one embodiment cover 28 is releasably secured to the back panel using repositionable adhesive at area 31.

Figure 4:
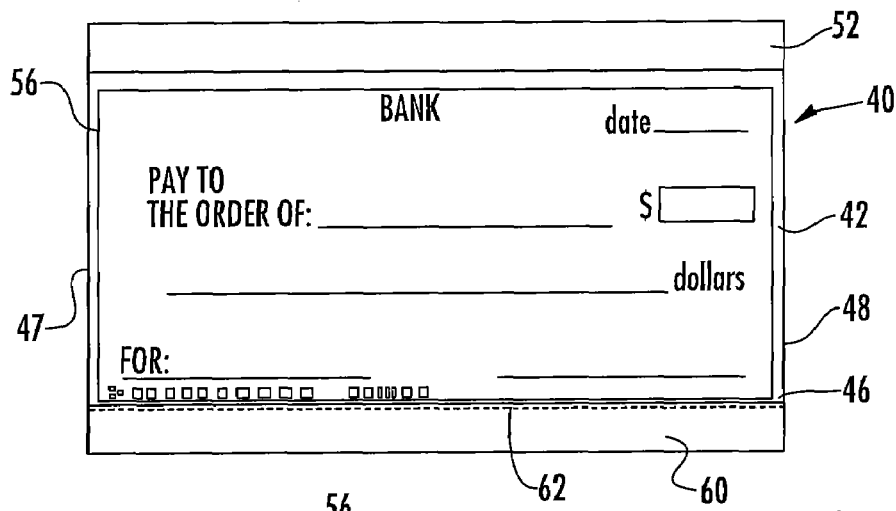
FIG. 4 is a front view of another embodiment of the check carrier of the invention with a check inserted.
Figure 5:
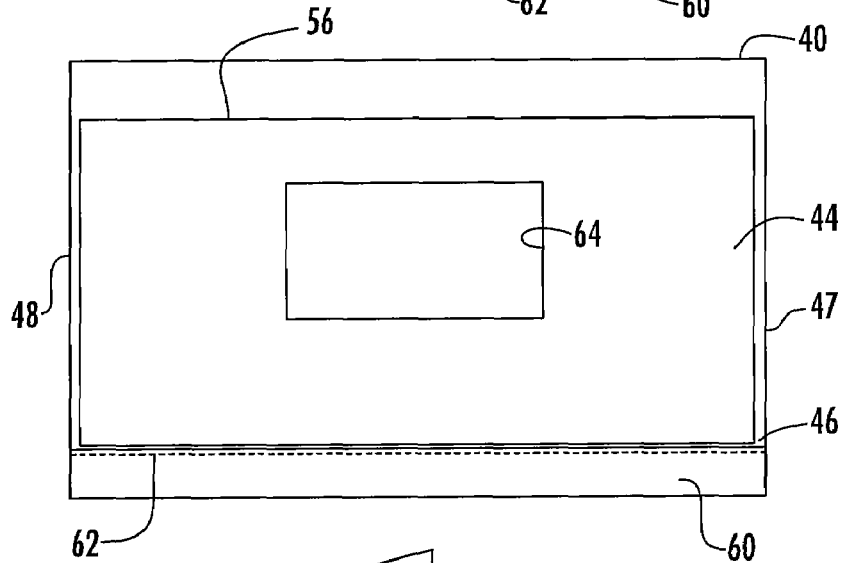
FIG. 5 is a back view of the check carrier of FIG. 4.
Figure 6:
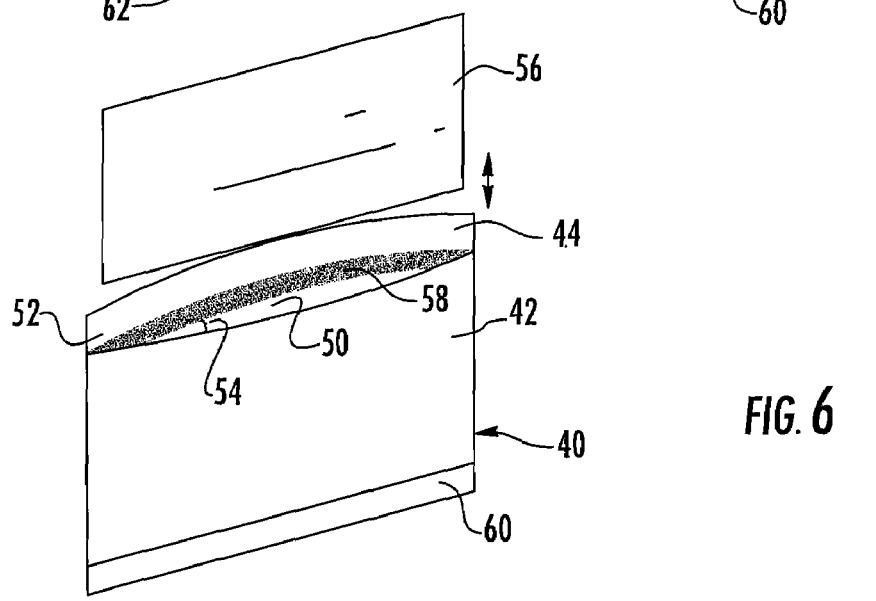
FIG. 6 is a perspective view of the check carrier of FIG. 4 with the check removed.

Referring to FIGS. 4, 5 and 6, a second embodiment of the check carrier 40 is described and includes a front panel 42 secured to back panel 44 along the bottom edge 46 and side edges 47 and 48 to create an interior space 50 as previously described. Back panel 44 is made slightly longer than front panel 46 such that an extended portion 52 of back panel 44 extends beyond the free edge of front panel 42 at opening 54. The extended portion 52 of back panel 44 facilitates the insertion of check 56 into the carrier. Opening 54 is closed after check 56 is inserted into carrier 40 using a closure mechanism such as repositionable adhesive applied at area 58 located along back panel 44. Other closing mechanisms could also be used as previously described. A window 64 is provided on the back panel 44 to allow access to the back of check 56 for endorsement stamps or as otherwise required by the financial institution.

As previously described with respect to the embodiment shown in FIGS. 1, 2 and 3, the front panel 42 and back panel 44 may be made of a thin, translucent material such that both the front and back of the check 56 may be scanned, sorted and processed using the financial institution's automated equipment. Carrier 40 includes a MICR area 60 for MICR printing as previously described. MICR area 60 is connected to the body of the check carrier at perforated line 62. Perforated line 62 allows the MICR area 60 to be easily separated from the check carrier if there is no need for the external MICR printing. The perforated line could be replaced by a score line or other weakened structure that would allow the MICR area 60 to be easily manually removed from the body of the check carrier. Removal of the MICR area 60 creates a check carrier 40 that is closer in external dimensions to the standard size check. Using a check carrier that is substantially the same dimensions as a standard check may facilitate the automatic scanning of the check on some apparatuses because the check is better aligned with respect to the check scanning equipment.

Figure 7:
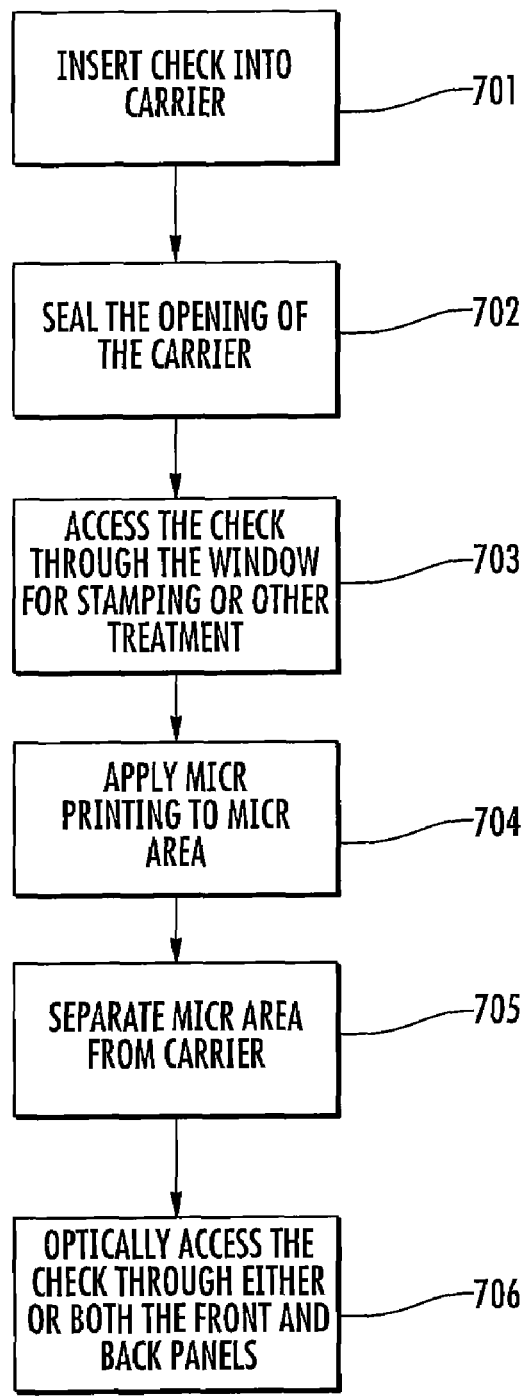
FIG. 7 is a flow chart illustrating the operation of the check carrier of the invention.

The operation of the check carrier of the invention will be described with reference to FIG. 7. When a damaged check is identified, it is placed into a check carrier that has an interior space that is dimensioned to closely receive the check, block 701. The opening is sealed using repositionable adhesive or some other releasable closure mechanism such that the check is retained within the carrier, block 702. The repositionable adhesive may be disposed on either the front or back panel so as to contact the check to fix the position of the check relative to the check carrier. The check can be accessed through the provided window for endorsement stamping or other treatment, block 703. MICR printing can be applied to the MICR area of the front panel if desired, block 704. If no MICR printing is used, the MICR area can be separated from the carrier at the perforations, block 705. Once the check is placed into the carrier, the carrier can be processed through the system just like a paper check where the check is optically accessed through either or both the front and back panels for scanning or sorting purposes or the like, block 706. The use of the carrier of the invention ensures that the check will not be lost and that it can be scanned and sorted in high speed automated equipment.

While embodiments of the invention are disclosed herein, various changes and modifications can be made without departing from the spirit and scope of the invention. The scope of the invention is indicated in the appended claims, and all changes that come within the meaning and range of equivalents are intended to be embraced therein.

What is claimed is:

1. A method of using a check carrier to secure a check in a manner such that the check can be processed by automated processing equipment, the method comprising:

providing the check carrier, said check carrier having a translucent front and a back defining an interior space therebetween for receiving the check such that both the front of the check and the back of the check are optically accessible, said interior space having a dimension that closely corresponds to a dimension of the check, and a closure mechanism for sealing the check in the space;

providing an area of the check carrier that is configured for receiving MICR printing, said area of the check carrier that is configured for receiving MICR printing being manually removable from said check carrier while the check is able to be sealed in said space;

determining if the MICR printing is needed on the area of the check carrier that is configured for receiving MICR printing;

if MICR printing is not needed, removing said area of the check carrier that is configured for receiving MICR printing before sending the check to be processed by the automated processing equipment, said removing said area of the check carrier that is configured for receiving MICR printing makes an external dimension of the check carrier similar to an external dimension of the check and thereby facilitates operation of the automated processing equipment;

inserting a check into said space;

sealing said check in said space using said closure mechanism; and sending said check carrier and said check to the automated processing equipment where the check is optically accessed through either said front or said back.

2. The method according to claim 1 wherein said area for receiving MICR printing is attached at a perforated connection.

3. The method according to claim 1 wherein the closure mechanism comprises a repositionable adhesive.

4. The method according to claim 3 wherein the repositionable adhesive is positioned on either the front or the back of the check carrier such that it contacts the check when the check is in said space to fix position of the check relative to the check carrier.

5. The method according to claim 4 wherein the back of the check carrier is a back panel having a window formed therein for allowing access to the back of the check.

6. The method of claim 5 wherein the window is covered by a removable cover that is attached to the check carrier by a repositionable adhesive.

7. A method of using a check carrier to secure a check in a manner such that the check can be processed by automated processing equipment, the method comprising:

providing the check carrier, said check carrier having a translucent front and a back defining an interior space therebetween for receiving the check such that both the front of the check and the back of the check are optically accessible, said interior space having a dimension that closely corresponds to a dimension of the check;

providing an area of the check carrier that is configured for receiving MICR printing, said area of the check carrier that is configured for receiving MICR printing being manually removable from said check carrier while the check is able to be sealed in said space;

determining if the MICR printing is needed on the area of the check carrier that is configured for receiving MICR printing; and if said MICR printing is not needed, removing said area of the check carrier that is configured for receiving MICR printing before sending the check to be processed by the automated processing equipment, said removing said area of the check carrier that is configured for receiving MICR printing makes an external dimension of the check carrier similar to an external dimension of the check and thereby facilitates operation of the automated processing equipment;

inserting a check into said interior space; and sending said check carrier and said check to the automated processing equipment.

8. The method according to claim 7 wherein said area for receiving MICR printing is attached at a perforated connection.

9. The method according to claim 7 wherein said check carrier comprises a closure mechanism for sealing the check in the space.

10. The method according to claim 9 wherein the closure mechanism comprises a repositionable adhesive.

11. The method according to claim 10 wherein the repositionable adhesive is positioned on either the front or the back of the check carrier such that it contacts the check when the check is in said space to fix position of the check relative to the check carrier.

12. The method according to claim 11 wherein the back of the check carrier is a back panel having a window formed therein for allowing access to the back of the check.

13. The method of claim 12 wherein the window is covered by a removable cover that is attached to the check carrier by a repositionable adhesive.

14. A method of using a check carrier to secure a check having a front and a back in a manner such that the check can be processed by automated processing equipment, the method comprising:

providing a check carrier having a translucent front and a back defining a space therebetween for receiving the check such that both the front of the check and the back of the check are optically accessible, said interior space having a dimension that closely corresponds to a dimension of the check, and a closure mechanism for sealing the check in the space;

providing an area of the check carrier that is configured for receiving MICR printing, said area of the check carrier that is configured for receiving MICR printing being manually removable from said check carrier while the check is able to be sealed in said space;

determining if the MICR printing is needed on the area of the check carrier that is configured for receiving MICR printing; and if MICR printing is not needed, adjusting a dimension of the check carrier such that the dimension of the check carrier is similar to a dimension of the check by removing said area of the check carrier that is configured for receiving MICR printing;

inserting said check into said space;

sealing said check in said space using said closure mechanism; and sending said check carrier and said check through an automated process where the check is optically accessed through either said front or said back.

15. The method according to claim 14 wherein said area for receiving MICR printing is attached at a perforated connection.

16. The method according to claim 14 wherein the closure mechanism comprises a repositionable adhesive.

17. The method according to claim 16 wherein the repositionable adhesive is positioned on either the front or the back of the check carrier such that it contacts the check when the check is in said space to fix position of the check relative to the check carrier.

18. The method according to claim 17 wherein the back of the check carrier is a back panel having a window formed therein for allowing access to the back of the check.

19. The method of claim 18 wherein the window is covered by a removable cover that is attached to the check carrier by a repositionable adhesive.

* * * * *